J. P. Smith.
Hay Loader

No. 56,331.  Patented July 10, 1866.

Witnesses.  John P. Smith
 per Brown, Coombs & C
  Atty's.

UNITED STATES PATENT OFFICE.

JOHN P. SMITH, OF HUDSON, ASSIGNOR TO HIMSELF, JOHN B. LONGLEY, OF HUDSON, AND W. H. SHUTTS, OF CLAVERACK, NEW YORK.

IMPROVEMENT IN MACHINES FOR RAKING AND LOADING HAY.

Specification forming part of Letters Patent No. 56,331, dated July 10, 1866.

*To all whom it may concern:*

Be it known that I, JOHN P. SMITH, of Hudson, in the county of Columbia and State of New York, have invented certain new and useful Improvements in Hay - Loading Machines; and I do hereby declare that the following is a full, clear, and exact description of the same, reference being had to the accompanying drawings, making a part of this specification, in which—

Figure 1:
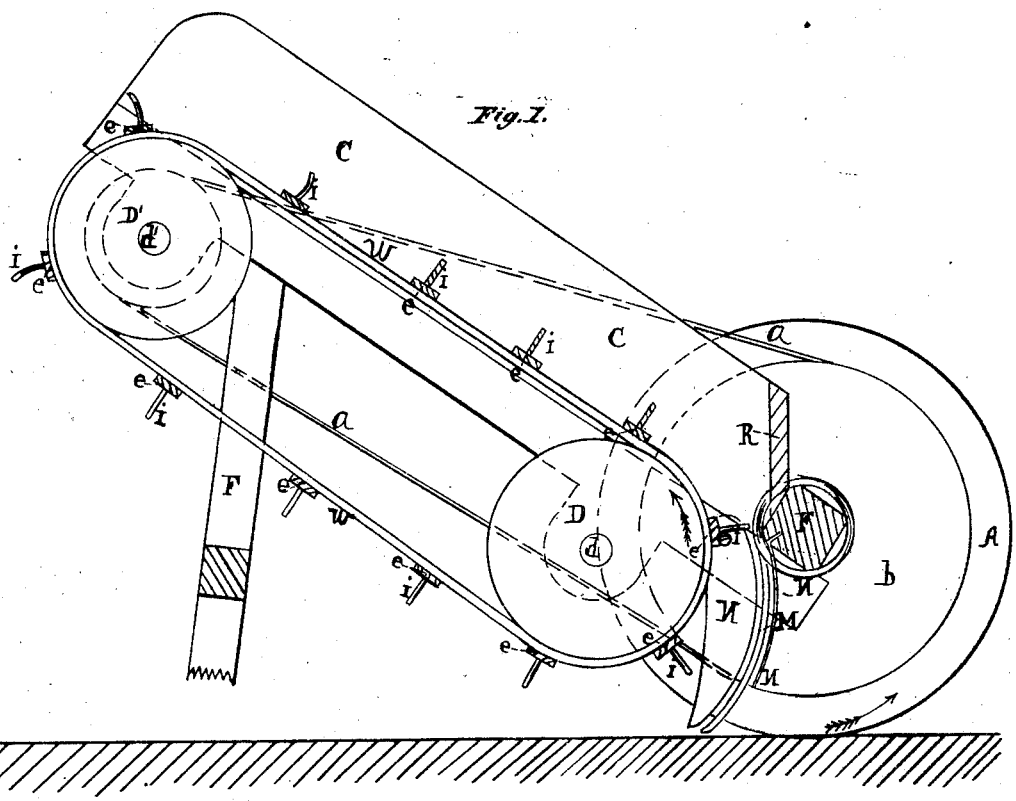
Figure 2:

Figure 1 is a vertical longitudinal section of a hay-loading machine constructed according to my invention. Fig. 2 is a detached view of a peculiarly-shaped carrier, which may be employed in place of the forks or tines ordinarily used in such machines to elevate the hay.

This invention belongs to that class of hay-loading machines in which a rake is employed to gather the hay from the ground, and an endless apron provided with tines or carriers is used to conduct it to the wagon upon which it is drawn to the barn or stack, the apparatus being attached to the said wagon and drawn behind the same. It is designed to prevent the escape of hay from the apparatus in a more effectual manner than has heretofore been accomplished; and it consists in a novel arrangement, with reference to the rake and endless apron, of guards placed at the ends of the rake, in order to prevent the hay from falling or escaping from the said ends when grasped or acted upon by the carriers of the apron; and, furthermore, in the employment of elastic plates situated between the teeth of the rake at their upper portions, in such manner as to prevent the hay, when unusually short or fine, from passing through the spaces between the teeth, and thus escaping when it is taken hold of by the carriers of the apron aforesaid.

To enable those skilled in the art to understand the construction and operation of my invention, I will proceed to describe it with reference to the drawings.

A represents a supporting-wheel, of which there are two, one upon each end of the axle F, which also forms the head of the rake, the teeth $m$ of which are curved forward, as shown in Fig. 1, and have their upper ends coiled around and secured to the said axle. Firmly attached to the axle F, at each end thereof, and close to the inner side of each supporting-wheel A, is a side-board, C. These side-boards, with suitable cross-braces to strengthen and connect them, constitute the frame - work which supports the endless elevating-apron $w$, with its appurtenances, and also prevents the hay from falling sidewise from the endless apron, all as will presently be explained. These side-boards stand at an angle to the ground of about forty-five degrees, but which may be more or less, if desired. Projecting downward from the front end of each side-board C is a post, E. These posts support the forward end of the apparatus when not in use. When the machine is in operation they are raised clear from the ground and are connected with the wagon by suitable rods or bars. Situated transversely between the side-boards C are two rollers or drums, D and D', one, D, at the lower or rear end of the said side-boards, and the other, D', at the forward or upper end thereof. The shafts $d$ and $d'$ of these drums are pivoted in suitable hangers secured to the lower edges of the side-boards. The endless apron $w$ is placed upon the drums D and D', and is moved or operated by the rotation of the upper drum, D', which is revolved by means of a belt, $a$, passing from a suitable pulley on one end of the shaft $d'$ to a band-wheel, $b$, on one end of the driving-wheels A. Secured transversely upon the exterior surface of the endless apron $w$, at a suitable distance apart, are a number of cross-bars, $e$, to which are attached the carriers $i$, which may consist of rows of straight or curved tines in the ordinary manner, or of a strip of sheet metal of suitable width set upon edge and having its upper edge serrated, as shown in Fig. 2.

The rake-teeth $m$ are so situated with regard to the endless belt where it passes over the lower drum, D, that as fast as the hay is gathered by them it is taken by the carriers and carried upward and upon the apron $w$, from which it falls upon the wagon as it passes over the upper drum, D', being prevented from falling sidewise from the apron, as it is carried up, by the side-boards.

Situated at each end of the rake is a broad flat guard, N, of wood or other suitable material, and bolted securely at its upper end to its contiguous side-board. The rearmost edges of these guards N are curved to correspond to the curvature of the teeth $m$, and the said guards are of sufficient width to prevent the hay from being thrown out sidewise from the rake as it is carried upward from the same by the carriers $i$ on the endless apron.

Placed in the upper portions of the spaces between the rake-teeth $m$ is a series of elastic plates, $n$, which may be made of sheet metal, and are attached at their upper ends to the axle F. These elastic plates extend downward about two-thirds, more or less, of the entire length of the rake-teeth, and are situated as aforesaid, one in each of the spaces between the said teeth, and prevent the hay, when unusually short or fine, from being forced back through the spaces between the teeth by the action of the carriers in taking it therefrom.

Placed longitudinally upon the axle F, and extending from one side-board C to the other, is a guard-board, R, which projects upward, as shown in Fig. 1, and prevents the hay from falling back over the axle F as it is conveyed upward from the rake.

By the use of these improvements the hay is kept from escaping from the apparatus at any part thereof, and the efficiency of the machine proportionally enhanced.

What I claim as new, and desire to secure by Letters Patent, is—

1. The guards N, in combination with the rake and endless elevating-apron, substantially as herein set forth, for the purpose specified.

2. The elastic plates $n$, arranged between the teeth and with regard to the endless elevating-apron, substantially as herein set forth, for the purpose specified.

JOHN P. SMITH.

Witnesses:
WILLIAM CARD,
CHAS. H. LOWN.